US010051024B2

United States Patent
DuBose

(10) Patent No.: US 10,051,024 B2
(45) Date of Patent: Aug. 14, 2018

(54) SYSTEM AND METHOD FOR ADAPTING CONTENT DELIVERY

(71) Applicant: CHARTER COMMUNICATIONS OPERATING, LLC, St. Louis, MO (US)

(72) Inventor: Kreig DuBose, Denver, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 176 days.

(21) Appl. No.: 13/803,372

(22) Filed: Mar. 14, 2013

(65) Prior Publication Data

US 2014/0280744 A1 Sep. 18, 2014

(51) Int. Cl.
*G06F 15/16* (2006.01)
*H04L 29/06* (2006.01)
*H04N 21/2225* (2011.01)
*H04N 21/2343* (2011.01)
*H04N 21/239* (2011.01)
*H04N 21/258* (2011.01)

(52) U.S. Cl.
CPC ......... *H04L 65/60* (2013.01); *H04N 21/2225* (2013.01); *H04N 21/2393* (2013.01); *H04N 21/234309* (2013.01); *H04N 21/25808* (2013.01); *H04N 21/25891* (2013.01)

(58) Field of Classification Search
CPC .............................. H04L 65/60; H04N 19/40; H04N 21/234309; H04N 21/25808; H04N 21/2393; H04N 21/2225
USPC ........................................................ 709/219
See application file for complete search history.

(56) References Cited

U.S. PATENT DOCUMENTS

| | | | | |
|---|---|---|---|---|
| 7,155,475 B2 * | 12/2006 | Agnoli et al. | ................ | 709/201 |
| 9,088,634 B1 * | 7/2015 | Corley | .................. | H04L 65/605 |
| 2003/0158913 A1 | 8/2003 | Agnoli | | |
| 2005/0028191 A1 * | 2/2005 | Sullivan | ............... | H04N 5/4401 725/28 |
| 2008/0097863 A1 * | 4/2008 | Spiegelman | ........... | G06Q 10/06 705/26.1 |
| 2008/0154955 A1 * | 6/2008 | Beaupre | ............... | G06F 17/3002 |
| 2008/0155613 A1 * | 6/2008 | Benya et al. | .................. | 725/89 |
| 2009/0133048 A1 * | 5/2009 | Gibbs | ............... | G06F 17/30038 725/14 |
| 2010/0070608 A1 * | 3/2010 | Hosur | ................. | G06F 17/3002 709/218 |
| 2012/0011267 A1 * | 1/2012 | Ma | ................... | H04N 21/44209 709/231 |

(Continued)

OTHER PUBLICATIONS

Li, et al. 'Cloud Transcoder: Bridging the Format and Resolution Gap between Internet Videos and Mobile Devices'. NOSSDAV '12 Proceedings of the 22nd International workshop on Network and Operating System . . . , pp. 33-38, 2012. ACM, New York, NY [retrieved on Jun. 9, 2016]. Retrieved from the Internet:<URL:http://dl.acm.org/citation.cfm?id=2229097>.*

(Continued)

*Primary Examiner* — S M Rahman
*Assistant Examiner* — Dae Kim
(74) *Attorney, Agent, or Firm* — Meagher Emanuel Laks Goldberg & Liao, LLP

(57) ABSTRACT

A system, method and apparatus for opportunistically transcoding requested content streams into one or more formats to provision thereby one or more content storage libraries.

24 Claims, 3 Drawing Sheets

(56) References Cited

U.S. PATENT DOCUMENTS

| | | | |
|---|---|---|---|
| 2012/0084463 A1* | 4/2012 | Holden | H04N 21/23439 709/246 |
| 2013/0054827 A1* | 2/2013 | Feher | H04L 29/06455 709/231 |
| 2013/0117418 A1* | 5/2013 | Mutton | H04N 21/8456 709/219 |
| 2013/0227060 A1* | 8/2013 | Sheynman | H04L 65/602 709/217 |

OTHER PUBLICATIONS

European Search Report dated May 8, 2015 in corresponding EP 14 158 869.9, pp. 1-7.

* cited by examiner

SYSTEM AND METHOD FOR ADAPTING CONTENT DELIVERY

FIELD OF THE INVENTION

The invention relates to the field of communication networks such as content delivery networks (CDNs) and, more particularly but not exclusively, to a mechanism for opportunistically provisioning content server libraries.

BACKGROUND

A content delivery network (CDN) may be implemented as a plurality of geographically dispersed real or virtual servers, data centers and the like linked via a public or private network, where each of the servers or data centers provides content to geographically proximate clients. A CDN may improve end-to-end content delivery to end-users by caching popular content closer to such users, by balancing server or data center loads, by transporting content between servers or data centers according to optimized content service protocols and the like. CDN's presently serve many different types of static and dynamic content, including web objects (text, graphics, URLs and scripts), downloadable objects (media files, software, documents), applications (e-commerce, portals), live streaming media, on-demand streaming media, and social networks.

Unfortunately, present CDN implementations do not adequately address delivery of bandwidth-intense content to user communities having many different types of client devices, such as client devices associated with differing content presentation capabilities, differing processor or memory resources, differing encoder/decoder protocols, differing communication or transport protocols and the like.

SUMMARY

Various deficiencies in the prior art are addressed by systems, methods and apparatus for opportunistically transcoding requested content streams into one or more formats to provision thereby one or more content storage libraries.

A method according to one embodiment comprises receiving a client request for a content title not stored in a local content library; streaming the requested content title toward the client from a remote content library including the requested content title; and if the request conforms to a business rule, performing a batch-based transcoding of the requested content title for subsequent storage in at least one other local content library.

BRIEF DESCRIPTION OF THE DRAWING

The teachings of the present invention can be readily understood by considering the following detailed description in conjunction with the accompanying drawing, in which.

To facilitate understanding, identical reference numerals have been used, where possible, to designate identical elements that are common to the figures.

DESCRIPTION

While the invention will be primarily described within the context of specific embodiments, it should be noted that the invention may be advantageously adapted to any content management and distribution system.

Various embodiments utilize content ratings, content popularity and/or other business rules or criteria to proactively acquire, transcode (if necessary), and store content for multiple devices and (optionally) at multiple bit rates or formats in response to an initial content request. In this manner, content provided to a requesting client or subscriber may be pre-staged for other clients or subscribers such that repeated, "on-the-fly" encoding of such content is avoided.

Figure 1:
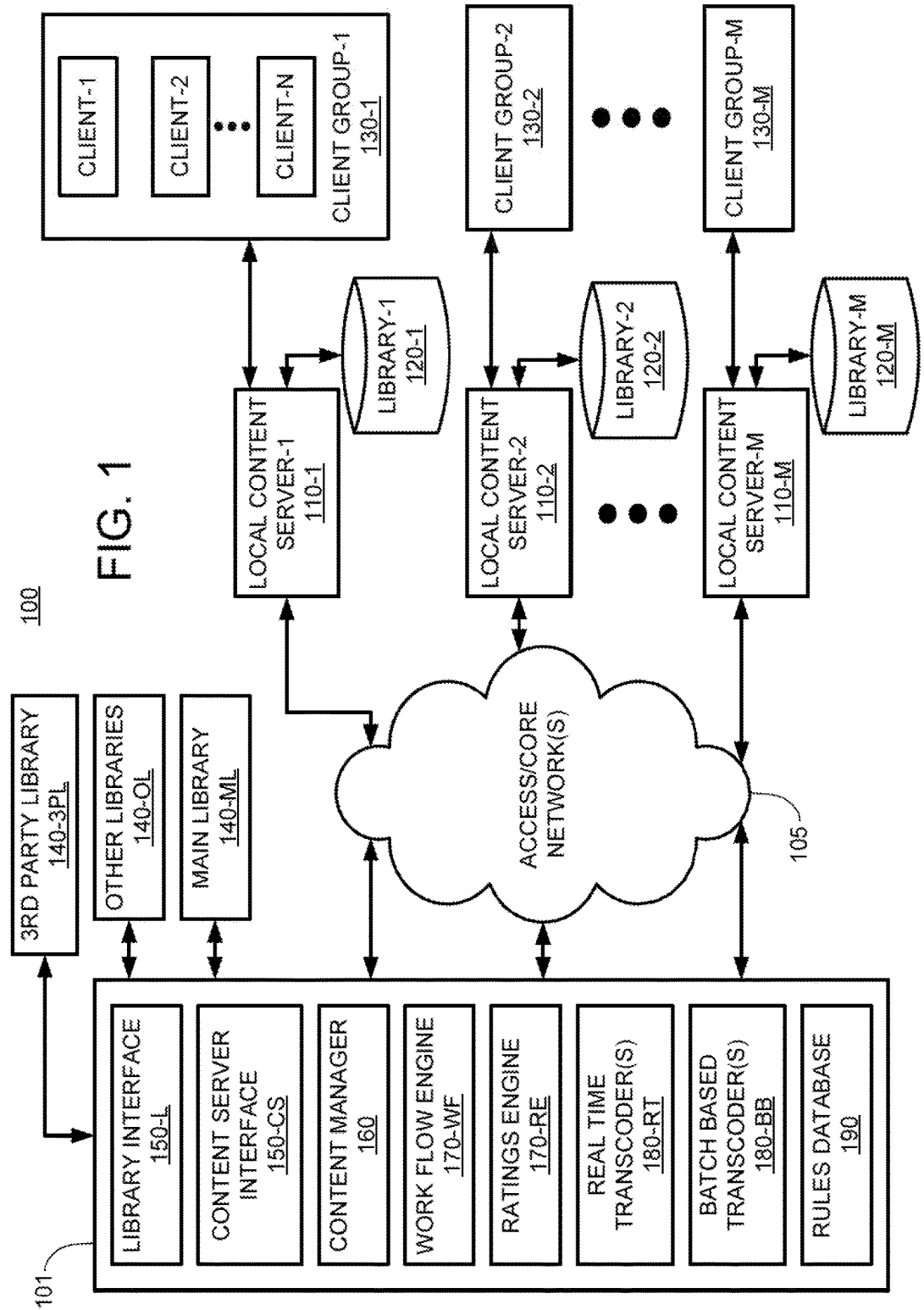
FIG. 1 depicts a high-level block diagram of an interactive information distribution system.

FIG. 1 depicts a high level block diagram of a content distribution network (CDN) according to various embodiments. Generally speaking, the content distribution network 100 of FIG. 1 contemplates a plurality of local content storage/distribution elements (110-130) that receive content from one or more remote content libraries (140-3PL, 140-OL and 140-ML in FIG. 1) under the control of various content management, processing and distribution systems or functions (150-L, 150-CS, 160, 170WF, 170-RE, 180-RT, 180-BB, 190). It is noted that each reference numbers 110, 120 and 130 refers to a plurality of elements (all or individually) from 1 to M (M being a finite integer of more than one) as demonstrated in FIG. 1. For example, the reference number 110 refers to 110-1, 110-2, . . . and/or 110-M, the reference number 120 refers to 120-1, 120-2, . . . and/or 120-M, and the reference number 130 refers to 130-1, 130-2, . . . and/or 130-M. In various embodiments, the local content storage/distribution elements and/or remote content libraries are included within a Federated CDN.

Referring to FIG. 1, each of a plurality of local content servers 110 operates to store content within a respective local library 120 (or plurality of local libraries/databases), and transmit content toward one or more client devices within a respective group of client devices 130 via a local distribution means or network. The content transmitted toward a client device may comprise content from a local library or content from a source remote with respect to the local content server 110.

The local content servers 110, local content libraries 120 and client devices 130 may comprise any type of content servers and client devices suitable for performing the various functions described herein.

The client devices 130 may comprise set-top boxes (STB), home or mobile computing devices (e.g., desktop computers, laptop computers, tablet computers and so on), smart phones and the like. Interaction between the local content server 110 and client devices 130 may be supported using any suitable local distribution means, such as known with respect to satellite networks, optical networks, hybrid fiber/coaxial networks, wireless networks, wireline networks and so on. As such, in various embodiments, the specific type of local content servers 110 and/or client devices 130 comprise those compatible with the local distribution means employed.

The local content libraries 120 may comprise any type of content library suitable for performing the various functions described herein. The local content libraries 120 may be implemented as functions within the local content servers 110, implemented as functions external to the local content servers 110 or any combination thereof. The local content libraries may comprise one or more bulk memory devices, a storage area network (SAN), Object Store (e.g., Simple Storage Service (S3) provided by Amazon Inc.) or some other means for storing content as is known.

The local content servers 110 may comprise network enabled computer servers operable to interact with the local content library 120, operable to interact with the local client devices 130 via the local distribution means or network, and operable to interact with remote content management resources via one or more access or core networks 105 as will be described in more detail below.

The local content servers 110 may receive content from various remote libraries 140 or other content management resources for local storage and subsequent distribution. The local content servers 110 may also receive streaming content for immediate or contemporaneous distribution to one or more client devices 130. Various embodiments contemplate local content servers 110 supporting unicast streams, multicast streams and so on.

A local or primary library 120 includes numerous titles but not every possible title. One or more remote or secondary libraries 140/120 store the remainder of the titles. In various embodiments, all the titles are distributed among a plurality of primary libraries. In various embodiments, each library includes common titles in a primary title pool and respective portions of the remaining titles in secondary title pools.

Content is distributed to the local content servers 110 from any of a number of remote content sources or libraries, such as a main content library 140-ML, other content libraries 140-OL, third-party content libraries 140-3PL and other local content libraries 120 (i.e., content libraries 120 associated with other local content servers 110). The distribution of such content is controlled by various content distribution and management functions, as described herein.

Content to be distributed may also require transcoding one or more times to enable presentation of the content on different types of client devices (i.e., client devices with different capabilities in terms of processing power, memory, video format and so on). For example, if client-requested content is not available from the library associated with the local content server, then the content must be retrieved from a remote content server or library. If the content retrieved from the remote content server or library is not in the format appropriate to the requesting client, then the content must be transcoded into the format appropriate to the requesting client.

In various embodiments, the content management and distribution functions utilize content ratings, content popularity and/or various other business rules to proactively acquire, transcode (if necessary), and store content for multiple devices and (optionally) at multiple bit rates or formats in response to an initial content request. In this manner, content provided to a requesting client or subscriber may be pre-staged for other clients or subscribers such that repeated on-the-fly encoding of such content is avoided.

Transcoding a requested content title is performed according to any of a plurality of video stream formats (e.g., MPEG2, MPEG4, H.261 and the like) and/or any of a plurality of video stream bitrates. The various formats and bitrates may be selected according to the capabilities of client devices (e.g., smart phone, STB and the like), the capability or types of transport networks used (e.g., 3G, 4G, FiOS, Hybrid fibre coax), the desired quality of content streams (e.g., High Definition video, Standard Definition video and the like) as well as other factors.

Thus, when transcoding a content title for subsequent storage and use by a remote content library or other local content library, the video stream format used by the transcoder is selected in accordance with any of a client device capability, transport network capability and desired quality of content stream associated with the remote content library or other local content library.

Referring to FIG. 1, a group of content management and distribution functions 101 is depicted as interacting with the various remote libraries 140 as well as the various local content servers 110 to implement the various embodiments described herein. It is noted that the various content management and distribution functions 101 may be implemented using one or more servers, management systems, computers and so on. Thus, while depicted and described herein as being implemented in a single element or device, in various embodiments the content management and distribution functions 101 may be implemented within a single device or system, across a plurality of devices or systems and so on to implement thereby the various embodiments.

The content management and distribution functions 101 are depicted as comprising a library interface 150-L, a content server interface 150-CS, a content manager 160, a work flow engine 170-WF, a ratings engine 170-RE, one or more real-time transcoders 180-RT, one or more batch-based transcoders 180-BB and a rules database 190. The various content management distribution functions will be described with respect to the various figures.

The library interface 150-L serves as an interface mechanism supporting communication between various content management distribution functions 101 and the libraries 140. Similarly, the content server interface 150-CS serves as an interface mechanism supporting communication between various content management distribution functions 101 and the local content servers 110. Various communication protocols, technical details and the like associated with such communication are known to those skilled in the art and omitted herein for simplicity.

The content manager 160 interacts with various content management and distribution functions 101, local content servers 110 and the like to provision content in the various libraries, perform load balancing as appropriate among the various libraries and content servers, interact with a network management system (NMS) or other service provider management system to adjust various parameters of the content distribution network (CDN).

The content manager 160 interacts with the rules database 190 to ensure that the data associated with content title ratings, content title importance and other business rules or criteria associated with content titles is properly maintained. It is noted that the rules database 190 may also be used to store other and general data, such as identification of which content titles are stored in which libraries, network performance data, congestion data and the like and so on.

The workflow engine 17-WF interacts with various content management distribution functions 101 to organize the flow of content between libraries, content servers and clients, as well the various transcoders described herein.

The ratings engine 170-RE interacts with various content management distribution functions 101 (and, optionally, third-party rating sources) to acquire ratings information associated with content. Generally speaking, ratings information comprises information suitable for use in determining which content types or content titles are or will be more popular than other content types or content titles. Various rules pertaining to popularity or importance of content titles are stored within the rules database 190.

Content rating may be derived from many factors, including whether the content is a newly released or old movie or other program, whether the content has received critical acclaim from professional reviewers (e.g., websites, newspapers and the like), whether the content has received critical acclaim from peer reviewers (e.g., individual or crowd-sourced reviews), whether or not the content is appropriate for certain audiences, whether or not the content is seasonal in nature, whether or not the content is geographically or otherwise specific in its appeal to viewers and so on.

Content rating may also be derived from user or subscriber feedback provided directly by asking users to rate content or equating new content with previously rated content. Content rating may also be derived indirectly from the user or subscriber interaction with the content distribution system, such as by tracking content requests, determining whether a content title was viewed in whole (higher rating) or in part (lower rating), what parts of the content were skipped and so on.

As an example, assume that a client requests a holiday-related content title that is not located in the local library associated with the client. The workflow engine is invoked to find the content title in another library and process the content title in real time as appropriate to enable presentation by the requesting client. Such real-time processing may comprise transcoding or other processing for adapting the format, bit rate, resolution or other parameters associated with the requested content title. This processing is performed in real time so that the requesting client may quickly receive the requested content title.

If the requested content title is also popular or important, or otherwise meets some business criteria indicative of future user/client demand, then further processing is performed upon the requested content title. This further processing may also comprise transcoding or other processing for adapting the format, bit rate, resolution or other parameters associated with the requested content title. This further processing may be used to generate multiple content streams and/or content files for storage at libraries. This further processing may be performed in real time, in an batch-mode (offline or non-real time), or in some combination of real-time and batch-mode processing.

Thus, business rules, criteria and other information is utilized by various elements within the present embodiments to determine which content titles may be transcoded from an initial video format to one or more other video formats, such as for subsequent distribution client devices of different capabilities, or via transport networks of different capabilities.

In various embodiments, a content title may be selected for transcoding and storage at various libraries if a number of requests for the content title, a rate at which the content title is requested or a ranking of that title exceeds a threshold level. Similarly, content titles associated with "newly available" movies, special events and the like may also be prioritized and/or stored in multiple libraries such that the general user experience is improved.

In various embodiments, content titles may be transcoded and stored at specific local libraries where the transport infrastructure supporting content streaming to proximate clients is frequently congested or simply insufficient.

In various embodiments, content titles may be transcoded for storage at multiple libraries and/or otherwise prioritized prior to an event likely to cause a surge of interest in the content title, such as an upcoming promotional or discounted program, a new release of the content title, a change in pricing tier associated with the content title and the like.

Figure 2:
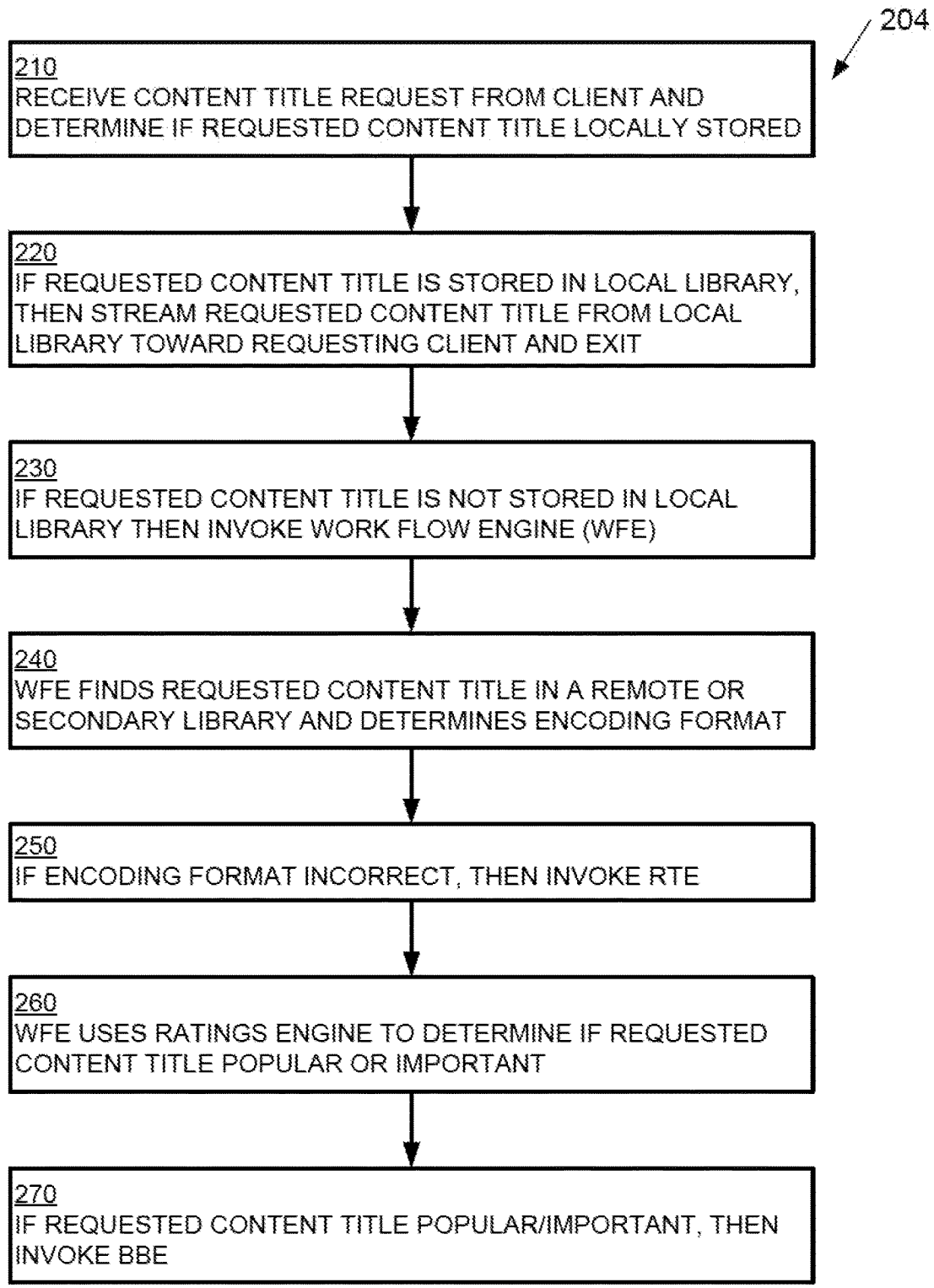
FIG. 2 depicts a high level block diagram of a subscriber terminal suitable for use in the interactive information distribution system of FIG. 1.

FIG. 2 depicts a flow diagram of a method according to one embodiment. Specifically, FIG. 2 depicts a flow diagram of a method 204 processing client requests for content titles.

At step 210, a content title request is received from a client at a local content server 110 and a determination is made as to whether the requested content title is stored in the local library 120 associated with the local content server 110. This determination may be made by the local content server 110, the content manager 160 or some other functional element within the content management system (CMS). For purposes of simplicity, it will be assumed that this and other CMS processes/determinations are invoked by or with the content manager 160.

If the CMS determines that the requested content is locally available, then at step 220 the local content server 110 streams the requested content title from the local library 120 toward the requesting client, and the method exits.

If the CMS determines that the requested content is not locally available, then at step 230 the CMS instructs that the work flow engine (WFE) 170-WF to provide the requested content title to the requesting client via some other mechanism.

At step 240, the WFE 170-WF cooperates with various functional elements and databases associated with the CMS to find the requested content title in a remote or secondary library, and to determine whether the found content title is encoded in a format appropriate to the requesting client.

At step 250, if the found requested content title is not encoded in a format appropriate to the requesting client, then the WFE 170-WF causes the unencoded or improperly coded found requested content title to be forwarded or streamed to a real time encoder or transcoder (RTE) 180-RT for encoding into a format suitable for use by the client. The corresponding encoded output of the RTE 180-RT is then streamed to the requesting client via the corresponding local content server 110 or some other path.

At step 260, the WFE 170-WF cooperates with the Ratings Engine (RE) 170-RE to determine if one or more rules or decision matrices indicate that the requested content title is popular, important or of sufficient interest to other clients that it should be encoded/transcoded in one or more other video formats and stored in the corresponding local library 120 or other local libraries in anticipation of future requests for the content title from other clients. Popularity may be determined according to client demand, "best seller" lists, third party rankings and so on.

At step 270, if the found requested content title is deemed to be of sufficient interest then the WSE 170-WF causes the found requested content title to be forwarded or streamed to a batch-based encoder or transcoder (BBE) 180-BB for encoding into one or more formats suitable for use by other clients.

The specific formats used by the batch-based encoder or transcoder 180-BB for encoding or transcoding may be determined with respect to expected requesting client device capabilities, general client device capabilities, default capabilities such as predefined low bit rate, high bit rate or minimum bit rate formats, standard definition, high definition and so on. Generally speaking, transcoding may be performed according to any of a plurality of video stream formats (e.g., MPEG2, MPEG4, H.261 and the like) and/or any of a plurality of video stream bitrates. The various formats and bitrates may be selected according to the capabilities of client devices (e.g., smart phone, STB and the like), the types of transport networks used (e.g., 3G, 4G, FiOS, Hybrid fibre coax), the desired quality of content streams (e.g., High Definition video, Standard Definition video and the like) as well as other factors.

Batch-based transcoding may be performed in a hierarchical manner to provide a single encoding format for use by client devices having differing capabilities. Encoding to multiple formats may be performed in parallel or individually.

In various embodiments, capabilities associated with the real time transcoders 180-RT and batch-based transcoders 180-BB may be combined to perform one or more content title transcoding processes on a real-time basis.

In various embodiments, a real-time transcoder is used as described above with respect to step 250 to provide an encoded content stream suitable for use by the requesting client. This encoded content stream may be provided via one of the real-time transcoders or batch-based transcoders.

In various embodiments, additional available real-time transcoders are opportunistically used to perform the batch-based transcoding functions described above with respect to step 270.

Figure 3:
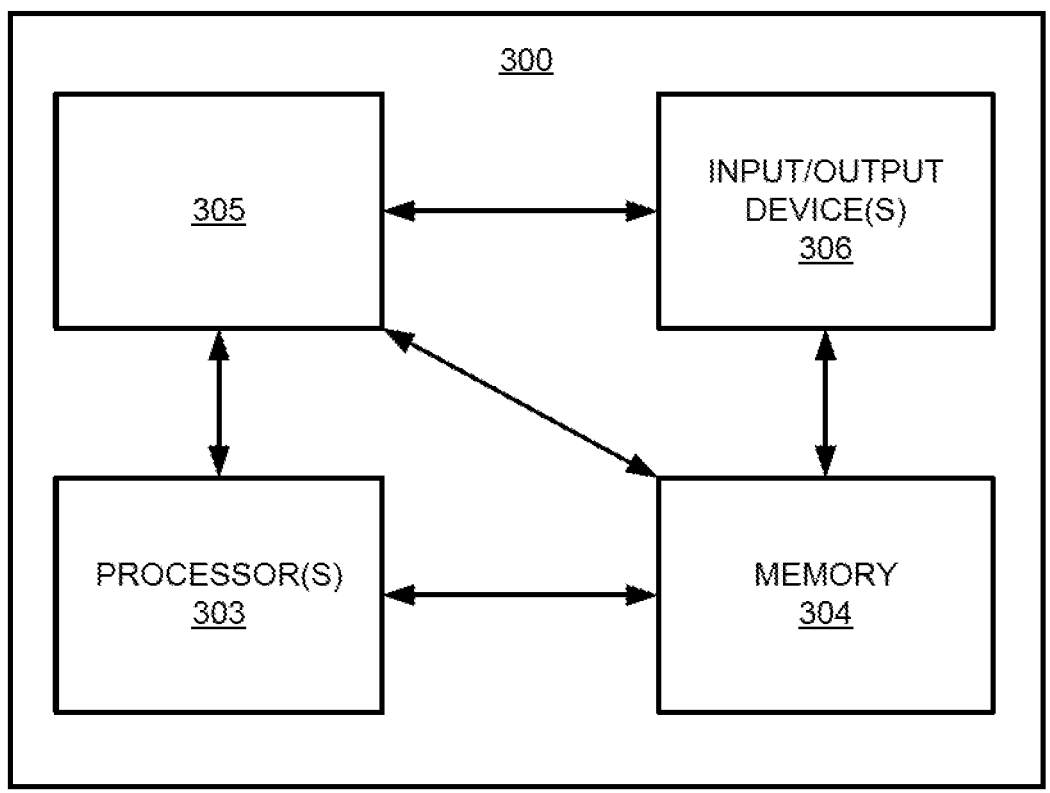
FIG. 3 depicts a high-level block diagram of a computer suitable for use in performing the functions described herein.

FIG. 3 depicts a high-level block diagram of a computer suitable for use in performing functions described herein.

As depicted in FIG. 3, computer 300 includes a processor element 303 (e.g., a central processing unit (CPU) and/or other suitable processor(s)), a memory 304 (e.g., random access memory (RAM), read only memory (ROM), and the like), a cooperating module/process 305, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the cooperating process 305 can be loaded into memory 304 and executed by processor 303 to implement the functions as discussed herein. Thus, cooperating process 305 (including associated data structures) can be stored on a computer readable storage medium, e.g., RAM memory, magnetic or optical drive or diskette, and the like.

It will be appreciated that computer 300 depicted in FIG. 3 provides a general architecture and functionality suitable for implementing functional elements described herein or portions of the functional elements described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions. Thus, the various functions initially described with respect to FIG. 3 may be adapted for use with appropriate elements as described in FIGS. 1 and 2.

Although various embodiments which incorporate the teachings of the present invention have been shown and described in detail herein, those skilled in the art can readily devise many other varied embodiments that still incorporate these teachings.

What is claimed is:

1. A method, performed by an apparatus comprising a processor, comprising:
    receiving a request from a client device for a content title not stored in a plurality of local content libraries, said client device comprising one of at least two client device types within a group of client devices capable of requesting content titles, wherein each client device type is associated with a respective encoding format;
    causing a streaming of the requested content title toward the client device from a remote content library; and
    if the request conforms to a business rule, contemporaneous to the streaming of the requested content toward the client device performing a batch-based transcoding of the streaming requested content title to provide a respective plurality of content title streams of different encoding formats selected in accordance with expected client devices including the requesting client device, and for subsequent storage of respective transcoded content in all or selected libraries of the plurality of local content libraries;
    wherein the business rule comprises a popularity associated with the requested content title exceeding a threshold level.

2. The method of claim 1, further comprising transcoding the requested content title to a format compatible with the requesting client device.

3. The method of claim 1, further comprising transcoding the requested content title to a format compatible with a transport network providing services to the requesting client device.

4. The method of claim 1, wherein said transcoding is performed by a plurality of real-time transcoders, each transcoder adapted for transcoding the requested content title according to a respective video stream format.

5. The method of claim 4, wherein said video stream formats are selected in accordance with any of a client device capability, transport network capability and desired quality of content stream associated with an intended other local content library.

6. The method of claim 1, wherein the content title popularity is determined using at least one of a number of content title requests and a rate of content title requests.

7. The method of claim 1, wherein said business rule further comprises a rating associated with the requested content title exceeding a threshold level.

8. The method of claim 7, wherein said content title rating is determined using one or more of a release date, viewer reviews, a suggested audience, a content seasonality indication, and a geographic appeal indication.

9. The method of claim 7, wherein said content title rating is determined directly using viewer rating responses.

10. The method of claim 7, wherein said content title rating is derived indirectly from user interaction with a content distribution system.

11. An apparatus, comprising a processor configured for:
    receiving a request from a client device for a content title not stored in a plurality of local content libraries, said client device comprising one of at least two client device types within a group of client devices capable of requesting content titles, wherein each client device type is associated with a respective encoding format;

causing a streaming of the requested content title toward the client device from a remote content library; and if the request conforms to a business rule, contemporaneous to the streaming of the requested content toward the client device performing a batch-based transcoding of the streaming requested content title to provide a respective plurality of content title streams of different encoding formats selected in accordance with expected client devices including the requesting client device, and for subsequent storage of respective transcoded content in all or selected libraries of the plurality of local content libraries;

wherein the business rule comprises a popularity associated with the requested content title exceeding a threshold level.

12. The apparatus of claim 11, wherein said processor is further configured for:

if the requested content title is not encoded in a format compatible with the requesting client device, transcoding the requested content title to a format compatible with the requesting client device;

if the requested content title is not encoded in a format compatible with a transport network providing services to the requesting client device, transcoding the requested content title to a format compatible with a transport network providing services to the requesting client device.

13. The apparatus of claim 11, wherein said transcoding is performed by a plurality of real-time transcoders, each transcoder adapted for transcoding the requested content title according to a respective video stream format.

14. The apparatus of claim 13, wherein said video stream formats are selected in accordance with any of a client device capability, transport network capability and desired quality of content stream associated with an intended other local content library.

15. The apparatus of claim 11, wherein the content title popularity is determined using at least one of a number of content title requests and a rate of content title requests.

16. The apparatus of claim 11, wherein said business rule further comprises a rating associated with the requested content title exceeding a threshold level, said content title rating being determined using one or more of a release date, viewer reviews, a suggested audience, a content seasonality indication, and a geographic appeal indication.

17. The apparatus of claim 16, wherein said content title rating is determined using one or both of viewer rating responses and user interaction with a content distribution system.

18. A non-transitory computer program product wherein computer instructions stored in a non-transitory computer readable memory, when processed by a computer, adapt the operation of the computer to provide a method, comprising:

receiving a request from a client device for a content title not stored in a plurality of local content libraries, said client device comprising one of at least two client device types within a group of client devices capable of requesting content titles, wherein each client device type is associated with a respective encoding format;

causing a streaming of the requested content title toward the client device from a remote content library; and if the request conforms to a business rule, contemporaneous to the streaming of the requested content toward the client device performing a batch-based transcoding of the streaming requested content title to provide a respective plurality of content title streams of different encoding formats selected in accordance with expected client devices including the requesting client device, and for subsequent storage of respective transcoded content in all or selected libraries of the plurality of local content libraries;

wherein the business rule comprises a popularity associated with the requested content title exceeding a threshold level.

19. The non-transitory computer program product of claim 18, wherein the method further comprises:

if the requested content title is not encoded in a format compatible with the requesting client device, transcoding the requested content title to a format compatible with the requesting client device;

if the requested content title is not encoded in a format compatible with a transport network providing services to the requesting client device, transcoding the requested content title to a format compatible with a transport network providing services to the requesting client device.

20. The non-transitory computer program product of claim 18, wherein said transcoding is performed by a plurality of real-time transcoders, each transcoder adapted for transcoding the requested content title according to a respective video stream format.

21. The non-transitory computer program product of claim 20, wherein said video stream formats are selected in accordance with any of a client device capability, transport network capability and desired quality of content stream associated with an intended other local content library.

22. The non-transitory computer program product of claim 18, wherein the content title popularity is determined using at least one of a number of content title requests and a rate of content title requests.

23. The non-transitory computer program product of claim 18, wherein said business rule further comprises a rating associated with the requested content title exceeding a threshold level, said content title rating being determined using one or more of a release date, viewer reviews, a suggested audience, a content seasonality indication, and a geographic appeal indication.

24. The non-transitory computer program product of claim 18, wherein said content title rating is determined using one or both of viewer rating responses and user interaction with a content distribution system.

* * * * *